(12) United States Patent
Gilson et al.

(10) Patent No.: US 10,107,191 B2
(45) Date of Patent: Oct. 23, 2018

(54) GEARED GAS TURBINE ENGINE WITH REDUCED FAN NOISE

(71) Applicant: United Technologies Corporation, Farmington, CT (US)

(72) Inventors: Jonthan Gilson, West Hartford, CT (US); Burce L. Morin, Springfield, MA (US); Ramons A. Reba, South Windsor, CT (US); David A. Topol, West Hartford, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 311 days.

(21) Appl. No.: 14/964,727

(22) Filed: Dec. 10, 2015

(65) Prior Publication Data

US 2016/0090909 A1    Mar. 31, 2016

Related U.S. Application Data

(63) Continuation-in-part of application No. 13/408,382, filed on Feb. 29, 2012.

(51) Int. Cl.
*F01D 9/04* (2006.01)
*F02C 3/107* (2006.01)
(Continued)

(52) U.S. Cl.
CPC .............. *F02C 3/107* (2013.01); *F01D 9/041* (2013.01); *F01D 25/162* (2013.01); *F02K 3/06* (2013.01);
(Continued)

(58) Field of Classification Search
CPC ...... F01D 9/041; F01D 25/162; F04D 29/664; F04D 29/544; F04D 29/542;
(Continued)

(56) References Cited

U.S. PATENT DOCUMENTS 2,029,813 A    2/1936 De Mey
3,536,414 A    10/1970 Smith, Jr.
(Continued)

FOREIGN PATENT DOCUMENTS

| EP | 1517022 | 3/2005 |
|---|---|---|
| GB | 2471845 A | 1/2011 |
| WO | 2014058478 A1 | 4/2014 |

OTHER PUBLICATIONS

"PurePower PW1000G Engine News," May 1, 2010.
(Continued)

*Primary Examiner* — Igor Kershteyn
(74) *Attorney, Agent, or Firm* — Carlson, Gaskey & Olds, P.C.

(57) ABSTRACT

A fan section for a gas turbine engine according to an example of the present disclosure includes, among other things, a fan rotor having fan blades, and a plurality of fan exit guide vanes positioned downstream of the fan rotor. The fan rotor is configured to be driven through a gear reduction. A ratio of a number of fan exit guide vanes to a number of fan blades is defined. The fan exit guide vanes are provided with optimized sweep and optimized lean.

30 Claims, 2 Drawing Sheets

(51) Int. Cl.
*F02K 3/06* (2006.01)
*F04D 29/54* (2006.01)
*F04D 29/66* (2006.01)
*F01D 25/16* (2006.01)

(52) U.S. Cl.
CPC ......... *F04D 29/542* (2013.01); *F04D 29/544* (2013.01); *F04D 29/664* (2013.01); *F04D 29/667* (2013.01); *F05D 2220/36* (2013.01); *F05D 2250/191* (2013.01); *F05D 2250/38* (2013.01); *F05D 2260/40311* (2013.01); *F05D 2260/96* (2013.01); *F05D 2260/961* (2013.01); *F05D 2300/603* (2013.01)

(58) Field of Classification Search
CPC .......... F04D 29/667; F02C 3/107; F02K 3/06; F05D 2220/36; F05D 2250/38; F05D 2250/191; F05D 2260/40311; F05D 2260/96; F05D 2260/961
See application file for complete search history.

(56) References Cited

U.S. PATENT DOCUMENTS

| | | | |
|---|---|---|---|
| 4,883,240 A | 11/1989 | Adamson et al. | |
| 4,916,894 A | 4/1990 | Adamson et al. | |
| 4,969,325 A | 11/1990 | Adamson et al. | |
| 6,125,626 A * | 10/2000 | El-Aini | F01D 5/10 60/226.1 |
| 6,554,564 B1 | 4/2003 | Lord | |
| 7,018,172 B2 | 3/2006 | Prasad et al. | |
| 7,074,006 B1 * | 7/2006 | Hathaway | F01D 11/10 415/1 |
| 7,101,145 B2 | 9/2006 | Tsuchiya et al. | |
| 7,540,354 B2 | 6/2009 | Morin et al. | |
| 7,607,287 B2 | 10/2009 | Reba et al. | |
| 7,631,483 B2 * | 12/2009 | Mani | B64D 33/02 181/214 |
| 7,832,981 B2 | 11/2010 | Hasan et al. | |
| 8,333,559 B2 | 12/2012 | Bushnell | |
| 8,869,508 B2 * | 10/2014 | Blackwell | F02K 1/09 239/265.33 |
| 2007/0084218 A1 | 4/2007 | Udall | |
| 2009/0014581 A1 | 1/2009 | Kebrle et al. | |
| 2010/0080697 A1 | 4/2010 | Wojno et al. | |
| 2010/0119366 A1 | 5/2010 | Bushnell | |
| 2013/0219922 A1 | 8/2013 | Gilson et al. | |

OTHER PUBLICATIONS

European Search Report for European Application No. 16202986.2 dated Apr. 20, 2017.
International Search Report and Written Opinion for International Application No. PCT/US2013/026575 dated Jun. 25, 2013.
International Preliminary Report on Patentability for International Application No. PCT/US2013/026575 dated Sep. 12, 2014.
Gliebe et al., "Effects of Vane/Blade Ratio and Spacing on Fan Noise," Dec. 1983, NASA, NASA CR-174664, Summary.
Trent 1000 sales flier, Jan. 2010, Rolls-Royce, VCOM13797 Issue 6, Jan. 6, 2010.

* cited by examiner

GEARED GAS TURBINE ENGINE WITH REDUCED FAN NOISE

CROSS REFERENCE TO RELATED APPLICATION

This application is a continuation-in-part of U.S. application Ser. No. 13/408,382, filed 29 Feb. 2012.

BACKGROUND

This application relates to a gas turbine engine having a gear reduction driving a fan, and wherein exit guide vanes for the fan are provided with noise reduction features.

Gas turbine engines are known, and typically include a fan delivering air into a compressor section. The air is compressed and passed into a combustion section where it is mixed with fuel and ignited. Products of this combustion pass downstream over turbine rotors, and the turbine rotors are driven to rotate the compressor and fan.

Traditionally, a low pressure turbine rotor drives a low pressure compressor section and the fan rotor at the identical speed. More recently, a gear reduction has been provided such that the fan can be rotated at a reduced rate.

With this provision of a gear, the diameter of the fan may be increased dramatically to achieve a number of operational benefits. Increasing fan diameter, however, implies that the fan noise sources will dominate the total engine noise signature.

A major fan noise source is caused by rotating turbulent wakes shed from the fan interacting with the stationary guide vanes. The stationary guide vanes, or fan exit guide vanes are positioned downstream of the fan. A discrete, or tonal, noise component of this interaction is caused by the specific number of fan wakes interacting with the specific number of vanes in a periodic fashion. A random, or broadband, noise source is generated from the nature of turbulence inside each fan wake interacting with each guide vane.

At a given engine power condition, if the ratio of guide vanes to fan blades is lower than a critical value, the tonal noise is said to be "cut-on" and may propagate to an outside observer location, e.g. an observer location either in the aircraft or on the ground. If the ratio of guide vanes to fan blades is above the critical value, however, the tonal noise is said to be "cut-off." Total engine noise may be dominated by tonal and/or broadband noise sources resulting from the fan wake/guide vane interaction.

Traditional acoustic design addresses tonal noise by targeting a cut-off vane count for subsonic fan tip speeds. The broadband noise, however, may require a lower vane count to decrease the number of turbulent sources. For a given number of fan blades, lowering the vane count below a critical value creates a cut-on condition and thus higher tone noise levels.

Thus, there is a tradeoff between addressing the two types of noise.

While cut-off vane counts have been utilized in the past, they have not been known in an engine including the above-mentioned gear reduction.

SUMMARY

A fan section for a gas turbine engine according to an example of the present disclosure includes a fan rotor having 30 or fewer fan blades, and a plurality of fan exit guide vanes positioned downstream of the fan rotor. The fan rotor is configured to be driven through a gear reduction. A first ratio of a number of fan exit guide vanes to a number of fan blades is between about 0.8 and about 2.5. The fan exit guide vanes are provided with optimized sweep and optimized lean wherein optimized sweep means that: (a) an outer periphery of the fan exit guide vane is positioned to be downstream of a location of an inner periphery of the fan exit guide vane; and (b) a sweep angle is between about 5 degrees and about 35 degrees; and optimized lean means that: (a) an outer periphery of the fan exit guide vane is positioned at a greater circumferential distance than an inner periphery of the fan exit guide vane in a direction of rotation of the fan rotor; and (b) a lean angle is greater than 0 degrees and is less than or equal to about 15 degrees.

In a further embodiment of any of the forgoing embodiments, a bypass ratio is defined by the volume of air delivered by the fan rotor into a bypass duct compared to the volume directed to an associated compressor section, and the bypass ratio is greater than about 6.

In a further embodiment of any of the forgoing embodiments, the lean angle is greater than or equal to about 2 degrees.

In a further embodiment of any of the forgoing embodiments, the bypass ratio is greater than about 10.

In a further embodiment of any of the forgoing embodiments, the sweep angle is between about 15 degrees and about 25 degrees.

In a further embodiment of any of the forgoing embodiments, the lean angle is greater than or equal to about 7 degrees.

In a further embodiment of any of the forgoing embodiments, the lean angle is greater than or equal to about 7 degrees.

In a further embodiment of any of the forgoing embodiments, the fan rotor defines a pressure ratio less than about 1.45.

In a further embodiment of any of the forgoing embodiments, the fan rotor is configured such that a blade tip speed of each of the fan blades is less than about 1150 ft/second at a cruise condition.

In a further embodiment of any of the forgoing embodiments, the first ratio is less than about 2.0.

In a further embodiment of any of the forgoing embodiments, each of the fan exit guide vanes defines a hollow opening covered by an acoustic liner having a perforated face sheet. The face sheet has a thickness, and a diameter of holes in the face sheet is selected to be less than or equal to about (0.3) of the thickness. Holes in the face sheet result in at least about 5% of a surface area of the face sheet.

A gas turbine engine according to an example of the present disclosure includes a fan section having a plurality of fan blades. The fan section defines a pressure ratio less than about 1.45. A geared arrangement is configured to drive the fan section. A compressor section includes a first compressor section and a second compressor section. A turbine section includes a first turbine section configured to drive the first compressor section, and a second turbine section configured to drive the second compressor section and the geared arrangement. A plurality of exit guide vanes are positioned downstream of the fan blades. A first ratio of a number of exit guide vanes to a number of fan blades is between about 0.8 and about 2.5. The exit guide vanes are provided with optimized sweep and optimized lean wherein optimized sweep means that: (a) an outer periphery of the exit guide vane is positioned to be downstream of a location of an inner periphery of the exit guide vane; and (b) a sweep angle is between about 5 degrees and about 35 degrees; and optimized lean means that: (a) an outer periphery of the exit guide vane is positioned at a greater circumferential distance than an inner periphery of the exit guide vane in a direction of rotation of the fan blades; and (b) a lean angle is greater than 0 degrees and less than or equal to about 15 degrees.

In a further embodiment of any of the forgoing embodiments, the lean angle is greater than or equal to about 2 degrees, and the sweep angle is greater than or equal to about 20 degrees.

In a further embodiment of any of the forgoing embodiments, the fan section has 26 or fewer fan blades.

In a further embodiment of any of the forgoing embodiments, the geared arrangement defines a gear reduction ratio greater than or equal to about 2.3. A pressure ratio across the second turbine section is greater than or equal to about 5. The fan section is configured such that a blade tip speed of each of the fan blades is less than about 1150 ft/second at a cruise condition.

In a further embodiment of any of the forgoing embodiments, the first ratio is greater than or equal to about 2.0.

In a further embodiment of any of the forgoing embodiments, the first ratio is less than about 2.0.

In a further embodiment of any of the forgoing embodiments, each of the exit guide vanes defines a hollow opening covered by an acoustic liner having a perforated face sheet. The face sheet has a thickness, and a diameter of holes in the face sheet is selected to be less than or equal to about (0.3) of the thickness. Holes in the face sheet result in at least about 5% of a surface area of the face sheet.

A method of designing a gas turbine engine according to an example of the present disclosure includes providing a fan section including 30 or fewer fan blades and defining a pressure ratio less than about 1.45, providing a geared arrangement configured to drive the fan section, providing a compressor section in fluid communication with the fan section, providing a turbine section, including both a first turbine section and a second turbine section, driving the compressor section and the geared arrangement via the turbine section, and providing a plurality of exit guide vanes positioned downstream of the fan blades. A first ratio of a number of exit guide vanes to a number of fan blades is between about 0.8 and about 2.5. The exit guide vanes are provided with optimized sweep and optimized lean wherein optimized sweep means that: (a) an outer periphery of the exit guide vane is positioned to be downstream of a location of an inner periphery of the exit guide vane; and (b) a sweep angle is between about 5 degrees and about 35 degrees, and wherein optimized lean means that: (a) an outer periphery of the exit guide vane is positioned at a greater circumferential distance than an inner periphery of the exit guide vane in a direction of rotation of the fan blades; and (b) a lean angle is greater than 0 degrees and is less than or equal to about 15 degrees.

In a further embodiment of any of the forgoing embodiments, the geared arrangement defines a gear reduction ratio greater than or equal to about 2.3. The second turbine section is configured to drive the geared arrangement such that a pressure ratio across the second turbine section is greater than or equal to about 5. The fan section is configured such that a blade tip speed of each of the fan blades is less than about 1150 ft/second at a cruise condition.

In a further embodiment of any of the forgoing embodiments, the first ratio is greater than or equal to about 2.0.

These and other features of the invention will be better understood from the following specifications and drawings, the following of which is a brief description.

DETAILED DESCRIPTION

Figure 1:
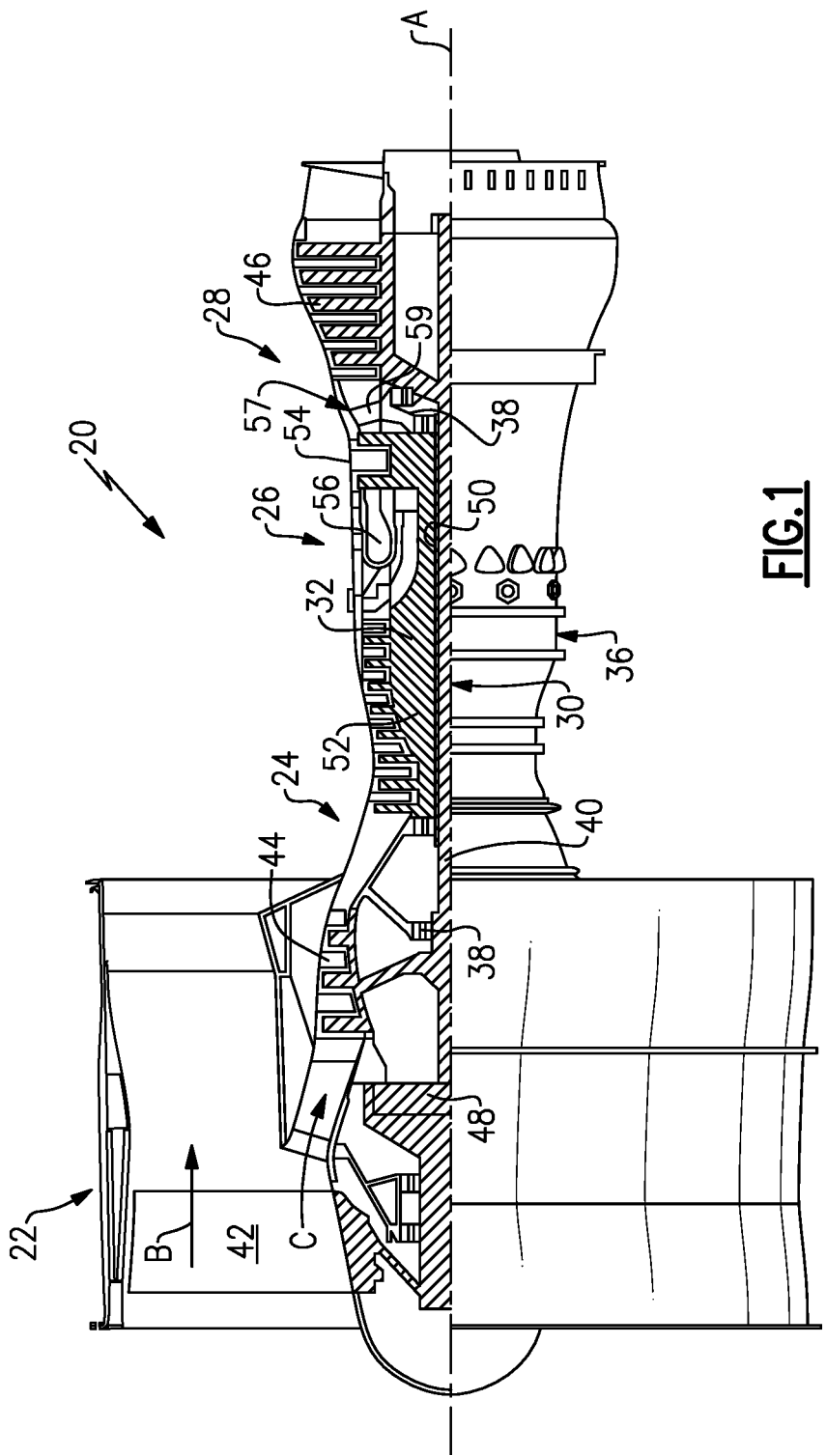
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In some examples, the gear reduction ratio is between about 2.5 and about 5.0. In other examples, the gear reduction ratio is less about 4.0. In some examples, the bypass ratio is less than about thirty (30), or more narrowly less than about twenty (20), In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second. In some examples, the fan 42 has 30 or fewer blades. In further examples, the fan 42 has 26 or fewer blades, or more narrowly 20 or fewer blades.

A method described herein, provides an acoustically optimized count and positioning of fan exist guide vanes in the geared turbofan architecture. In the case where the vane/blade ratio is low enough to generate an additional tone noise source, i.e. a "cut-on" condition, an acoustic feature should be applied to the surface of the guide vane to mitigate the additional tone noise.

Figure 2A:
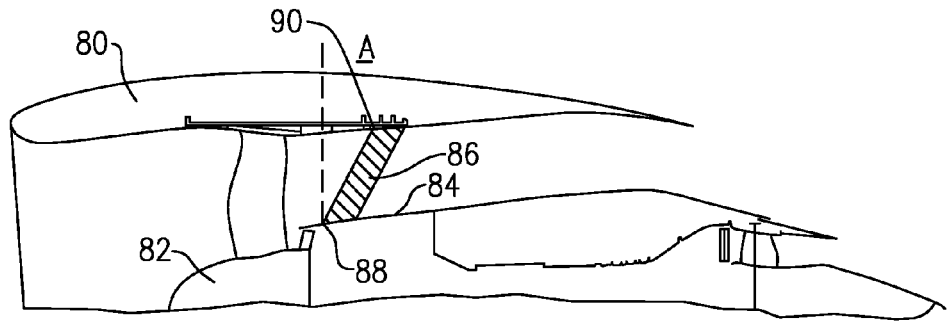
FIG. 2A shows a detail of a fan exit guide vane.

FIG. 2A shows a fan which has an exit guide vane 86 provided with any one of several noise treatment features. An outer cowl 80 is spaced outwardly of a fan rotor 82. Exit guide vanes 86 extend between an outer core housing 84 and the inner surface of the cowl 80. The guide vane 86 is actually one of several circumferentially spaced guide vanes. As mentioned above, the number of guide vanes compared to the number of rotor blades on the fan rotor control the cut-off and cut-on features of the noise produced by the fan rotor. Specifically, the ratio of guide vanes to fan blades should be between about 0.8 and about 2.5, and is described in embodiments of this disclosure.

Below some critical number the ratio can result in the noise being "cut-on". Generally this critical number is somewhere near 2. Above the critical value, the ratio of guide vanes to fan blades may result in an overall engine that sufficiently addresses the noise on its own. Thus, engines have a ratio of guide vanes to fan blades above the critical value and provide value benefits when used in a geared turbofan engine.

When the ratio is below the critical number, however, some additional acoustic feature may be in order. Three potential acoustic features are discussed below.

In FIG. 2A, the fan exit guide vane 86 is shown to have optimized sweep. Sweep means that an inner periphery 88 of the vane is upstream of the location 90 of the outer periphery of the guide vane 86. In embodiments, the sweep angle A will be greater than about 0 and less than or equal to about 35 degrees. The sweep angle A will generally be greater than or equal to about 5 degrees. In embodiments, the sweep angle A will be greater than or equal to about 15 degrees. In some embodiments, the sweep angle A is greater than about 15 degrees and is less than or equal to about 25 degrees, or more narrowly greater than about 20 degrees and less than or equal to about 25 degrees. In other embodiments, the sweep angle A is less than or equal to about 30 degrees. Optimized guide vane sweep provides a reduced noise signature for the geared turbofan.

Figure 2B:
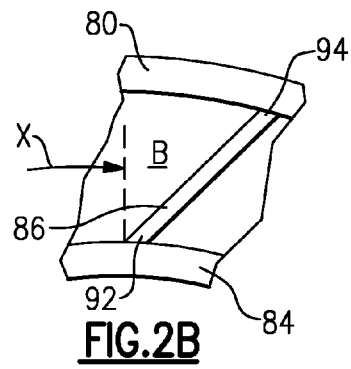
FIG. 2B shows another view of the FIG. 2A guide vane.

FIG. 2B shows that the vanes 86 may also be provided with optimized lean. In embodiments, a lean angle B will be greater than 0 and less than or equal to about 15 degrees. The lean angle B will generally be greater than or equal to about 2.0 degrees. In embodiments, the lean angle will be greater than or equal to about 7 degrees. As shown in FIG. 2B the vanes 86 have an outer peripheral surface 94 positioned at a greater circumferential distance from the inner periphery 92, where circumferential distance is defined in the direction of fan rotation. Optimized guide vane lean provides a reduced noise signature for the geared turbofan.

Figure 3A:
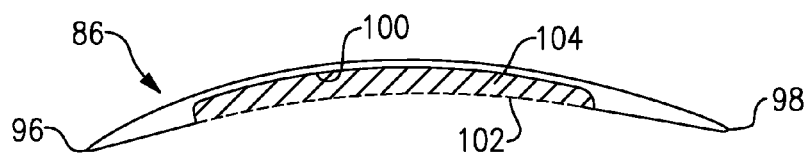
FIG. 3A shows a cross-section through a guide vane.
Figure 3B:
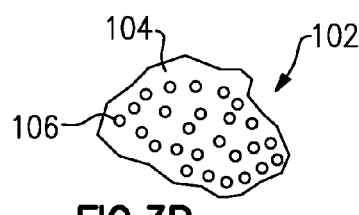
FIG. 3B shows a portion of a material incorporated into the FIG. 3A guide vane.
Figure 3C:
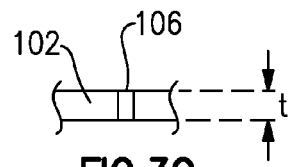
FIG. 3C shows another feature of the material.

FIG. 3A shows another guide vane 86 that has an acoustic feature positioned between the leading edge 96, and the trailing edge 98 of the vane, on the pressure surface of the airfoil. The acoustic feature may be an acoustic liner as shown in FIGS. 3A-3C. The liner has a face sheet 102 over a segmented cavity 104 sitting in an opening 100 in the vane 86. Holes 106 are in face sheet 102. These holes are typically very small. As shown in FIG. 3, a thickness t of the face sheet 102 may be defined. The holes have a diameter less than or equal to about 0.3 t. More narrowly, the diameter is less than or equal to 0.2 t. Generally, the holes will take up at least 5% of the surface area of the material.

One micro-perforated acoustic liner may be as disclosed in U.S. Pat. No. 7,540,354B2, "Microperforated Acoustic Liner," Jun. 2, 2009. The disclosure from this patent relating to this one example liner material is incorporated herein by reference in its entirety.

The several features mentioned above may all be utilized in combination, or each separately. In some cases, it may be desired to optimize the guide vane count and a non-zero sweep angle with 0 degrees of lean. Similarly, it may be desired to optimize the guide vane count and a non-zero lean angle with 0 degrees of sweep.

Although an embodiment of this invention has been disclosed, a worker of ordinary skill in this art would recognize that certain modifications would come within the scope of this invention. For that reason, the following claims should be studied to determine the true scope and content of this invention.

What is claimed is:
1. A gas turbine engine comprising:
  a fan section having a plurality of fan blades, said fan section having a low fan pressure ratio of less than 1.45, wherein the low fan pressure ratio is measured across one of said fan blades alone;
  a geared arrangement that drives said fan section;
  a compressor section including a first compressor section and a second compressor section;
  a turbine section including a first turbine section that drives said first compressor section, and a second turbine section that drives said second compressor section and said geared arrangement;

a plurality of exit guide vanes positioned downstream of said fan blades;

wherein a first ratio of a number of exit guide vanes to a number of fan blades being between 0.8 and 2.5; and wherein said exit guide vanes are provided with sweep and lean, wherein sweep means that: (a) an outer periphery of said exit guide vane is positioned to be downstream of a location of an inner periphery of said exit guide vane; and (b) a sweep angle is between 15 degrees and 30 degrees, and wherein lean means that: (a) an outer periphery of said exit guide vane is positioned at a greater circumferential distance than an inner periphery of said exit guide vane in a direction of rotation of said fan blades; and (b) a lean angle is greater than or equal to 2 degrees and less than or equal to 15 degrees.

2. The gas turbine engine as set forth in claim 1, wherein said sweep angle is greater than or equal to 20 degrees.

3. The gas turbine engine as set forth in claim 1, wherein said fan section has 26 or fewer fan blades.

4. The gas turbine engine as set forth in claim 3, wherein:
said geared arrangement has a gear reduction ratio greater than or equal to 2.3;
wherein the second turbine section includes an inlet, an outlet and a pressure ratio of greater than 5, the pressure ratio being pressure measured prior to the inlet as related to pressure at the outlet prior to an exhaust nozzle; and
wherein the fan has a low corrected fan tip speed of less than 1150 ft/second.

5. The gas turbine engine as set forth in claim 4, wherein said first ratio is greater than or equal to 2.0.

6. The gas turbine engine as set forth in claim 4, wherein said first ratio is less than 2.0.

7. The gas turbine engine as set forth in claim 4, wherein:
each of said exit guide vanes defines a hollow opening covered by an acoustic liner having a perforated face sheet;
said face sheet has a thickness, and a diameter of holes in said face sheet is selected to be less than or equal 0.3 of the thickness.

8. The gas turbine engine as set forth in claim 7, wherein said holes in said face sheet are at least 5% of a surface area of said face sheet.

9. The gas turbine engine as set forth in claim 8, wherein said diameter is less than or equal to 0.2 of the thickness.

10. The gas turbine engine as set forth in claim 1, wherein:
each of said exit guide vanes defines a hollow opening covered by an acoustic liner having a perforated face sheet;
said face sheet has a thickness, and a diameter of holes in said face sheet is selected to be less than or equal 0.3 of the thickness.

11. The gas turbine engine as set forth in claim 10, wherein said holes in said face sheet are at least 5% of a surface area of said face sheet.

12. The gas turbine engine as set forth in claim 11, wherein said diameter is less than or equal to 0.2 of the thickness.

13. A gas turbine engine comprising:
a fan section having a plurality of fan blades, said fan section having a low fan pressure ratio of less than 1.45, wherein the low fan pressure ratio is measured across one of said fan blades alone;
a geared arrangement that drives said fan section;
a compressor section including a first compressor section and a second compressor section;
a turbine section including a first turbine section that drives said first compressor section, and a second turbine section that drives said second compressor section and said geared arrangement;
a plurality of exit guide vanes positioned downstream of said fan blades;
wherein a first ratio of a number of exit guide vanes to a number of fan blades being between 0.8 and 2.0; and
wherein said exit guide vanes are provided with sweep and lean,
wherein sweep means that: (a) an outer periphery of said exit guide vane is positioned to be downstream of a location of an inner periphery of said exit guide vane; and (b) a sweep angle is between 5 degrees and 35 degrees,
wherein lean means that: (a) an outer periphery of said exit guide vane is positioned at a greater circumferential distance than an inner periphery of said exit guide vane in a direction of rotation of said fan blades; and (b) a lean angle is greater than or equal to 2 degrees and less than or equal to 15 degrees.

14. The gas turbine engine as set forth in claim 13, wherein said lean angle is greater than or equal to 2 degrees, and said sweep angle is greater than or equal to 20 degrees.

15. The gas turbine engine as set forth in claim 13, wherein said fan section has 26 or fewer fan blades.

16. The gas turbine engine as set forth in claim 15, wherein:
said geared arrangement has a gear reduction ratio greater than or equal to 2.3;
wherein the second turbine section includes an inlet, an outlet and a pressure ratio of greater than 5, the pressure ratio being pressure measured prior to the inlet as related to pressure at the outlet prior to an exhaust nozzle; and
wherein the fan has a low corrected fan tip speed of less than 1150 ft/second.

17. The gas turbine engine as set forth in claim 16, wherein said first ratio is greater than or equal to 2.0.

18. The gas turbine engine as set forth in claim 16, wherein said first ratio is less than 2.0.

19. The gas turbine engine as set forth in claim 16, wherein:
each of said exit guide vanes defines a hollow opening covered by an acoustic liner having a perforated face sheet;
said face sheet has a thickness, and a diameter of holes in said face sheet is selected to be less than or equal to 0.3 of the thickness; and
holes in said face sheet are at least 5% of a surface area of said face sheet.

20. The gas turbine engine as set forth in claim 19, wherein said diameter is less than or equal to 0.2 of the thickness.

21. The gas turbine engine as set forth in claim 13, wherein said geared arrangement is between said fan section and said second turbine section.

22. A gas turbine engine comprising:
a fan section having a plurality of fan blades;
a geared arrangement that drives said fan section;
a compressor section including a first compressor section and a second compressor section;
a turbine section including a first turbine section that drives said first compressor section, and a second turbine section that drives said second compressor section and said geared arrangement;

a plurality of exit guide vanes positioned downstream of said fan blades;

wherein a first ratio of a number of exit guide vanes to a number of fan blades being between 0.8 and 2.5;

wherein said exit guide vanes are provided with sweep and lean, wherein sweep means that: (a) an outer periphery of said exit guide vane is positioned to be downstream of a location of an inner periphery of said exit guide vane; and (b) a sweep angle is between 5 degrees and 35 degrees, wherein lean means that: (a) an outer periphery of said exit guide vane is positioned at a greater circumferential distance than an inner periphery of said exit guide vane in a direction of rotation of said fan blades; and (b) a lean angle is greater than 0 degrees and less than or equal to 15 degrees; and each of said exit guide vanes defines a hollow opening covered by an acoustic liner having a perforated face sheet;

said face sheet has a thickness, and a diameter of holes in said face sheet is selected to be less than or equal to 0.3 of the thickness; and holes in said face sheet are at least 5% of a surface area of said face sheet.

23. The gas turbine engine as set forth in claim 22, wherein said lean angle is greater than or equal to 2 degrees, and said sweep angle is greater than or equal to 20 degrees.

24. The gas turbine engine as set forth in claim 22, wherein said fan section has 26 or fewer fan blades.

25. The gas turbine engine as set forth in claim 4, wherein:
said geared arrangement has a gear reduction ratio greater than or equal to 2.3;
wherein the second turbine section includes an inlet, an outlet and a pressure ratio of greater than 5, the pressure ratio being pressure measured prior to the inlet as related to pressure at the outlet prior to an exhaust nozzle; and
wherein the fan has a low corrected fan tip speed of less than 1150 ft/second.

26. The gas turbine engine as set forth in claim 25, wherein said first ratio is greater than or equal to 2.0.

27. The gas turbine engine as set forth in claim 25, wherein said first ratio is less than 2.0.

28. The gas turbine engine as set forth in claim 25, wherein said diameter is less than or equal to 0.2 of the thickness.

29. The gas turbine engine as set forth in claim 28, wherein said lean angle is greater than or equal to 2 degrees, and said sweep angle is greater than or equal to 20 degrees.

30. The gas turbine engine as set forth in claim 22, wherein said first ratio is less than 2.0.

* * * * *